(No Model.)
L. B. ROWLEY.
SECONDARY BATTERY.
No. 515,502. Patented Feb. 27, 1894.
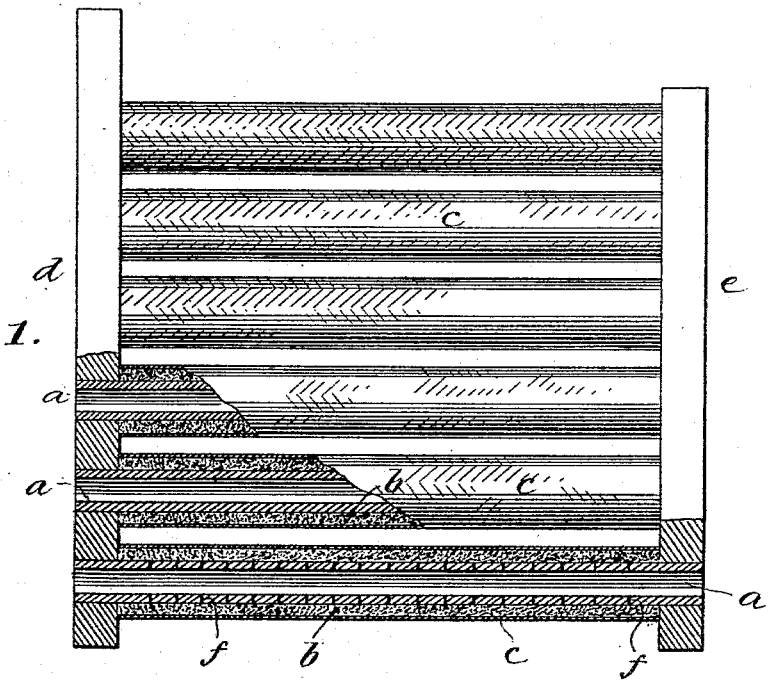
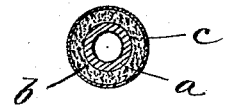
WITNESSES:
Frank S. Ober
W. A. Opperman
INVENTOR
Leslie B. Rowley
BY
[signature]
ATTORNEY

UNITED STATES PATENT OFFICE.

LESLIE B. ROWLEY, OF ASHLAND, WISCONSIN.

SECONDARY BATTERY.

SPECIFICATION forming part of Letters Patent No. 515,502, dated February 27, 1894.

Application filed February 7, 1893. Serial No. 461,361. (No model.)

*To all whom it may concern:*

Be it known that I, LESLIE B. ROWLEY, a citizen of the United States, residing at Ashland, in the county of Ashland and State of Wisconsin, have invented certain new and useful Improvements in Secondary Batteries, of which the following is a full, clear, and exact description.

My invention relates to secondary or storage batteries, the object being to provide a battery which shall have long life, large surface, not be injuriously affected under a high rate of charge or discharge, and cheap of manufacture.

With these objects in view, the invention consists in building up each plate or electrode of the battery of a series of tubes, horizontally disposed, one above the other, and connected at each end by vertical supports through which the tubes project. A free circulation exists through the tubes and they are surrounded or coated by a layer of active material which is held in place when first applied, by a sheathing of non-conducting material, such as asbestus or perforated celluloid, and after the forming process is held in place by the adhesive quality which the process of forming imparts to the material.

The invention will be described with reference to the accompanying drawings, in which—

Figure 1 represents a side elevation of my improved battery plate showing portions of the tube in section; and Fig. 2 is a transverse section of one of the tubes.

Referring to the drawings by letter, $a$ represents a lead tube constituting the core or support of the active material $b$, which is applied to the outside of the tube, and is held thereon by a sheathing $c$, of braided or sheet asbestus, or perforated celluloid, or other non-conducting material. The active material may be applied in the form of a paste or it may be put on in the form of a powder. When the plates are "formed," the active material becomes very hard and is knitted into the surface of the tube. It therefore, to a great extent holds itself in place. The ends of the tubes are left free from the active material and sheathing, and are inserted into holes formed in two upright pieces $d$ and $e$, with which an intimate contact is maintained. A number of the tubes are thus connected to the uprights, one placed above the other, and standing in parallel horizontal planes. One of the uprights forms a connecting lug for the plate. With this construction it will be observed that any given tube of a plate is, throughout its entire length, in the same stratum of solution, and is therefore subjected to the same density of acid throughout. Hence it is, that a rapid charge or discharge cannot cause warping of any tube, and as the individual tubes do not warp, the plate as a whole will not warp, and the battery will therefore have long life. If desired, the walls of the lead tubes may be perforated as indicated at $f$, so that a portion of the active material will enter the holes and be subjected to the solution which circulates through the tube. The battery therefore will have a large, active surface and will be very efficient, as shown by the dotted lines in Fig. 2.

Having thus described my invention, I claim—

1. A secondary battery electrode consisting of the combination of a series of tubes, horizontally disposed, and two uprights by which said tubes are supported, a space being left between the adjacent tubes for the circulation of the electrolyte, substantially as described.

2. The combination with a series of horizontally disposed, metallic tubes, provided on their exterior surfaces with active material, of upright or end pieces, through which said tubes pass, thus permitting of a circulation therethrough the tubes with their active material being separated to permit of circulation between them, substantially as described.

3. The combination of a series of horizontally disposed, metallic tubes provided on their exterior surfaces with active material which is held in place by a sheathing of non-conducting material, and a pair of uprights connected to the ends of said tubes, but not obstructing the circulation therethrough, substantially as described.

In testimony whereof I subscribe my signature in presence of two witnesses.

LESLIE B. ROWLEY.

Witnesses:
C. F. LATIMER,
J. S. ELLIS.